Aug. 9, 1960 F. C. WILLIAMS ET AL 2,948,830

ELECTRICAL STORAGE APPARATUS

Filed Sept. 20, 1948 3 Sheets-Sheet 1

F. C. WILLIAMS AND T. KILBURN

*Inventors*

By Moore and Hall

*Attorneys*

Inventors
F. C. WILLIAMS
T. KILBURN
By Moore and Hall
Attorneys

F. C. WILLIAMS AND T. KILBURN
*Inventors*
By Moore and Hall
*Attorneys*

United States Patent Office 2,948,830

Patented Aug. 9, 1960

2,948,830

ELECTRICAL STORAGE APPARATUS

Frederic Calland Williams, Timperley, and Tom Kilburn, Northfield, England, assignors, by mesne assignments, to International Business Machines Corporation, New York, N.Y., a corporation of New York Filed Sept. 20, 1948, Ser. No. 50,136

Claims priority, application Great Britain Oct. 2, 1947

38 Claims. (Cl. 315—12)

Figure 1:
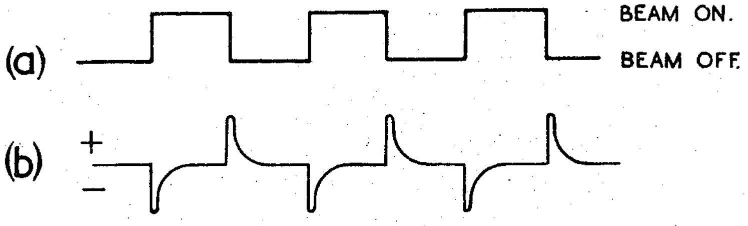

The present invention relates to electrical storage apparatus in which data in an electrical form are converted into a charge pattern on an insulating surface, the original electrical signals being reconstituted in a reading operation.

It is a desideratum that it should be possible to read the stored information without erasing it, and one object of the present invention is to provide improved apparatus providing this facility.

Another object of the invention is concerned with the fact that no insulating surface will, in fact, hold a charge pattern indefinitely. In practice, leakage of charge over the surface has limited the storage time to a maximum of a few hours. It has been proposed, in the specification of British patent application No. 36,587/46 corresponding to United States application Serial Number 790,879, filed December 10, 1947, to avoid this limitation by periodically regenerating the charge pattern at intervals short compared with the maximum storage time, and this invention aims to provide improved regenerating means which are of wide application, and are simple and reliable in operation.

The invention is of particular (but not exclusive) application to storage in digital computers and like machines. In a binary computer, for example, the digits 0 and 1 are readily represented by different electrical signals, and all numbers, operations, routing instructions and so on can be represented by groups of signals made up from the two elementary ones. The present invention accordingly aims to provide improved means for recording, reading and regenerating groups of signals in binary and other computers, and like machines.

According to the present invention, an electrical information-storing system is provided comprising an insulating, recording surface contained in an evacuated envelope with means for producing an electron beam at a velocity such that, when the beam strikes the surface, the number of secondary electrons liberated is greater than the number of primary electrons arriving, means for causing the beam to irradiate repetitively a discrete area of said surface so as to cause said area to assume a state of charge significant of one element of information, modulating means adapted when operated to enable said beam to irradiate also a part of said surface adjacent said discrete area so as to modify the state of charge of said discrete area to render it significant of a different element of information, signal pick-up means associated with said surface, means for extracting from said signal pick-up means signals arising thereon at subsequent irradiations of said discrete area, and means for causing said signals to determine the operation of said modulating means in dependence on the state of charge due to the previous irradiation.

The invention is based on a discovery which is discussed in detail below, but which can be shortly summarised here in the following terms. In suitable circumstances, the charge distribution left behind it on an insulating surface by a cathode-ray beam which impinges transiently on one discrete elementary area of the screen is dependent on whether the beam is also permitted to impinge subsequently on adjacent elementary areas: that is to say, the charge distribution due to irradiating one discrete elementary area may be modified by allowing the beam to proceed to irradiate an adjacent elementary area. The nature of any part of a charge pattern formed on an insulating surface by an irradiating cathode-ray beam can be ascertained by reconverting the pattern into electrical signals by re-exploring the surface with the beam. This is the process of reading the charge pattern.

The invention makes use of the fact that since the process of regeneration involves the production of signals corresponding to the charge pattern, it is also in fact a reading process; in general, however, it is convenient to arrange to re-generate the whole of a charge pattern in a cyclic way, whilst making provision for the reading of any specific part of the pattern as it may become necessary.

Figure 7:
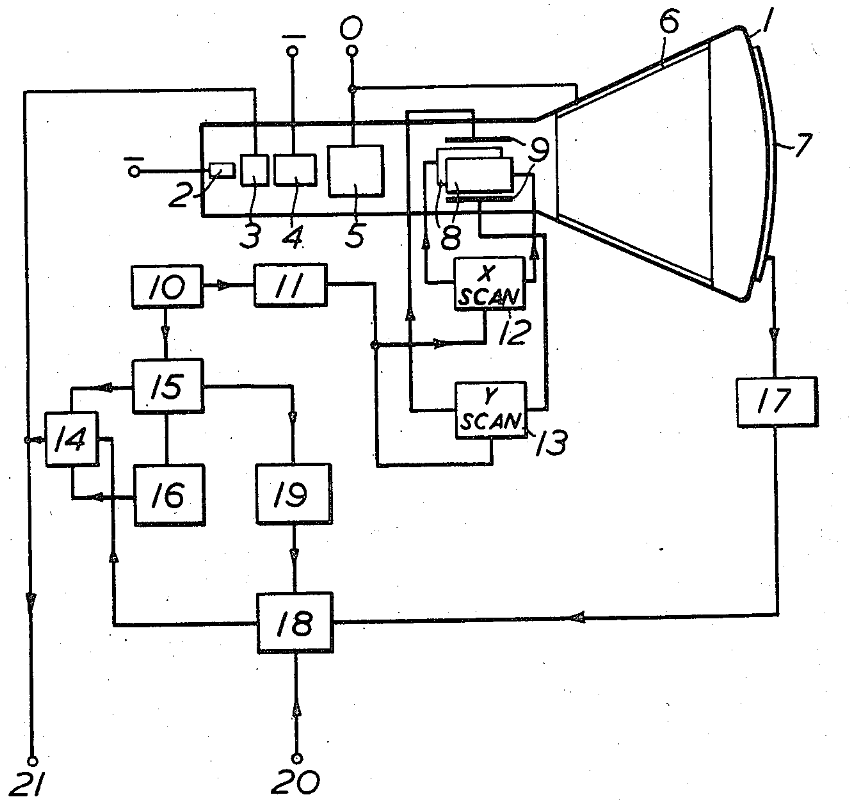

In the following desecription reference will be made to the accompanying drawings, in which:

Figs. 1–6 are explanatory diagrams illustrating the theory and experimental results on which this invention is based, and Fig. 7 is a block schematic diagram of one form which the apparatus according to the invention may take.

It will be convenient, before discussing particular embodiments of the invention, to consider in more detail the discoveries on which it is based.

The screen surface of a cathode-ray tube may be made to have a secondary emission ratio greater than unity under selected conditions of operation. Thus when the beam falls steadily on a single spot on the screen, that spot first becomes positively charged, because more secondaries leave the spot than there are primaries arriving; but when the spot becomes more positive than the most positive electrode in the tube (usually the third anode) secondaries are attracted back to the spot, and the effective secondary emission ratio falls until it is unity; in this equilibrium condition, the potential of the spot has a steady value of some few volts positive relative to the third anode, adjacent areas of the screen being slightly negative relative to the third anode because of the rain of secondaries to which they have been subjected. The time taken to establish equilibrium depends on the capacity of the screen surface, the current density of the beam, the secondary emission ratio and the law governing the return of secondaries to the bombarded spot as a function of the potential of that spot relative to the third anode potential. Experiments indicate that the beam may be regarded as an ohmic resistance to the first order of approximation, and the time constant formed by this resistance and the screen capacity may be of the order of 1 microsec. or less. In conditions of equilibrium there is of course no net current to the screen surface, which is here assumed to be a perfect insulator; the secondary emission is then exactly equal to the primary current.

Suppose now that there is a metallic-pick-up plate on the outside of the face of the tube which bears the screen, the plate being earthed through a small resistance coupled to an amplifier, and the arrangement being such that the output voltage of the amplifier has the waveform of the current flowing from the pick-up plate to earth; and suppose that the beam current is turned on and off in a regular, repetitive fashion by a bright-up square wave whilst the spot is held stationary. After some time, assuming that there is no leakage between successive bright-ups, the spot will have assumed its equilibrium positive charge, and at each successive bright-up, no redistribution of screen surface charge will take place. Hence there will be no contribution to the amplifier output due to a change in surface charge. However, when the beam is turned on, a number of electrons in the beam itself and in the cloud of secondaries returning to the third anode are suddenly introduced in the vicinity of the pick-up plate. This is equivalent to suddenly bringing a negative charge near the pick-up plate, and a transient negative current flows in the resistance due to induced charge on the plate. The electron cloud is introduced extremely rapidly if the square wave is sharp, and the shape of the amplifier output pulse will be defined entirely by the transient response of the amplifier. When the beam is turned off by the square wave, the electron cloud is suddenly removed, and an equal and opposite positive pulse appears at the amplifier output. The size of these pulses will depend only on the beam current, and not on the spot size. Their amplitude will therefore depend mainly on the brilliance control and hardly at all on the focus control.

Certain experimental results and theoretical deductions upon which the invention is based will be described with reference to Figures 1 to 6. The amplifier output under the conditions set forth in the preceding paragraph has been found to be of the nature indicated in Figure 1(*b*), and in Figure 1(*a*) there is illustrated approximately the bright-up waveform by which the beam current was modulated. Fig. 2 shows schematically the potential distribution at, and around the bombarded spot under equilibrium conditions.

Figure 3:
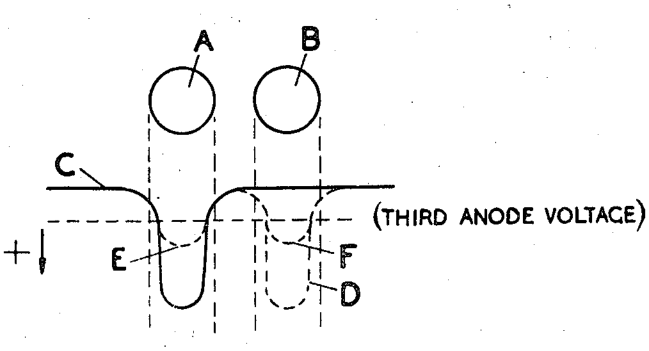
Figure 4:
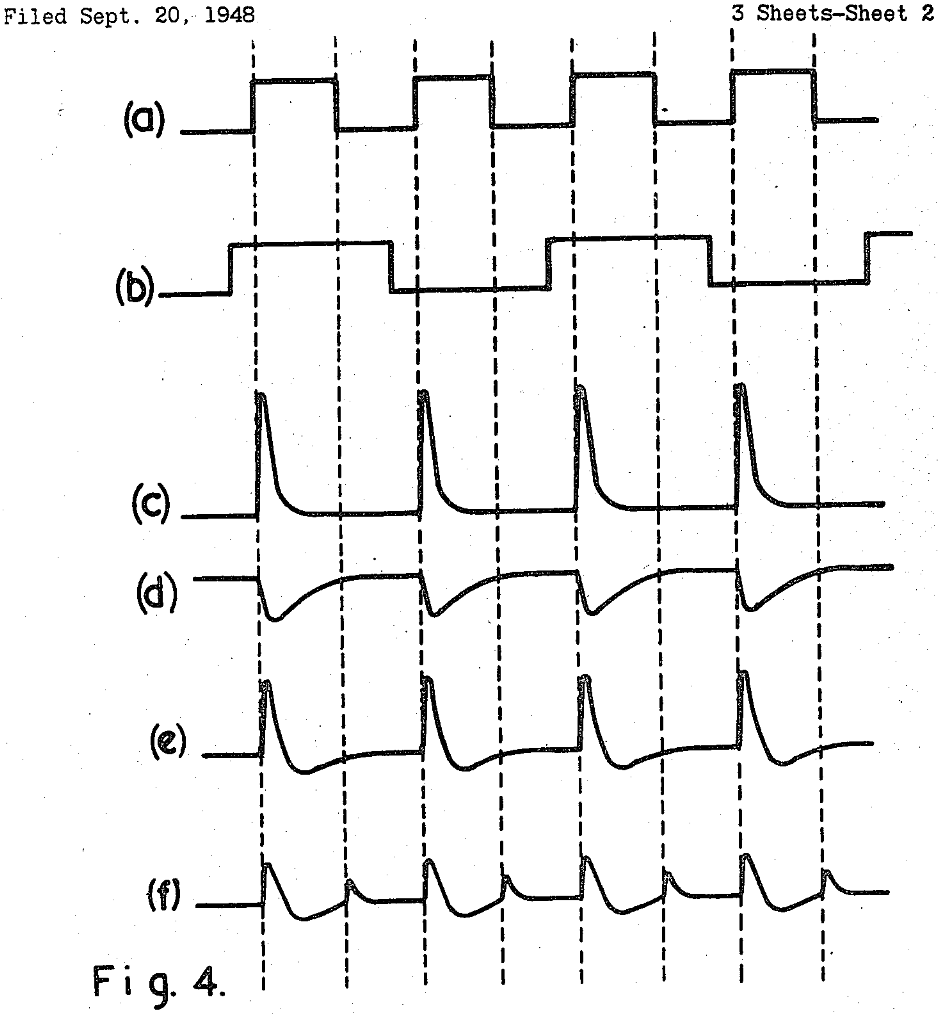
Figure 5:
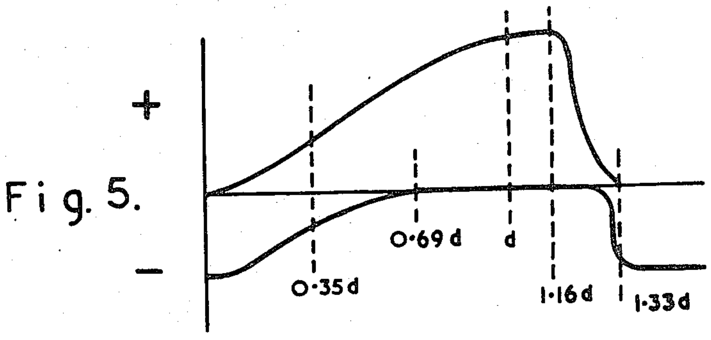
Figure 6:
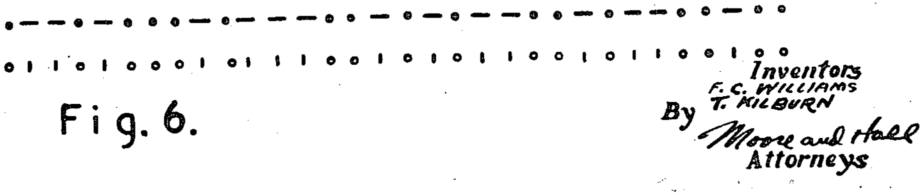

Suppose now that arrangements are made to bombard in succession two spots such as A and B, Fig. 3, with their centres about 1.25 spot diameters apart. This can be achieved by modulating the beam current by a waveform as shown in Fig. 4(*a*) whilst deflecting the spot under the control of a square wave of one half the frequency of that in Fig. 4(*a*), phased as shown in Fig. 4(*b*). When the beam impinges on spot A, a charge distribution as shown by the full line C, Fig. 3, will be set up. The beam is now turned off and then turned on again in position B. The newly bombarded spot will rapidly move positive, and the positive "well" (shown by the dotted line D) will be generated. Some of the secondary electrons thrown out in the process will be attracted into the well left by the beam under spot A and will "fall" into it and begin to "fill it up" (dotted line E). Even after the well under B has reached equilibrium depth, which it will do very quickly, the emitted secondaries can still fall into the A well and continue filling it up. How far it will fill is not at present known. The fuller it gets, the less likely are secondaries from the well under B to reach it. After equilibrium has been reached, the beam is turned off, moved back to A and turned on again. The A well is rapidly re-excavated to full depth, and the well left at B is re-filled to some extent as before as shown by the dotted line F. This process of excavating one well and partially filling the other can be repeated indefinitely, and if the system is symmetrical, the charge thrown out of one well will equal in magnitude that deposited in the other, since the charge thrown out was deposited during the previous half cycle of operation.

If the precise electrons emitted in excavating one well went immediately to the filling of the other, no signal would be collected at the collector plate, ignoring for a moment the contribution from the electron cloud described with reference to Fig. 1. In fact, however, the excavation process is much more rapid than the filling process, as would be expected, for whereas all emitted secondaries emerge with velocities away from the bombarded spot, only a fraction of them have velocities towards the well being filled.

Treating the two effects separately, there is obtained firstly, the waveform at the amplifier output terminal due to excavation of one well and then of the other (the contribution of the electron cloud being still ignored). When the beam is turned on, the net current leaving the bombarded spot is of a magnitude depending on the primary current $I_p$ and the ratio $$\frac{I_s}{I_p}=n$$

where $I_s$ is the total secondary electron current. The relevant value of $n$ is not likely to correspond with the drawing off of all the secondary electrons emitted, since it is probable that the bombarded spot is still positive relative to the third anode and to adjacent areas of the screen apart from the other well: $n$ must, however, exceed unity, since some filling has occurred since the previous equilibrium state which corresponded with $n=1$. The bombarded spot, therefore, moves positive, and the well is deepened. As the well deepens, $n$ will fall towards its equilibrium value of unity, so that the rate of change of potential of the bombarded spot begins to fall at once from its initial value towards zero. The corresponding current in the pick-up plate resistance, therefore, rises instantaneously to its highest positive value, and then falls towards zero, apparently roughly according to an exponential law corresponding with the resistive beam impedance. The waveform of this part of the current is shown by Fig. 4(*c*).

The waveform (Fig. 4(*d*)) due to the simultaneous filling of the adjacent well is of similar shape, but is of opposite sign and has a smaller amplitude and a longer time scale. The area under curves (*c*) and (*d*) is, however, the same. The net waveform, still excluding the electron cloud effect, is the sum of (*c*) and (*d*) and is shown at (*e*) in Fig. 4.

If it is assumed that spot size determines the diameter of the well, and that the secondary emission velocities determine its depth, and also the extent to which the adjacent well is filled, the variation of magnitude and time scale of waveform *e* as a function of brilliance and focus may be assessed as follows:

With given beam current, de-focusing to twice the diameter (accompanied by an appropriate adjusting of the magnitude of the shift square wave (*b*) so that a spacing of 1¼ diameter is retained) will result in increasing the area of the charge surface by a factor of 4, but this area will move positive at ¼ of the speed since the beam density has been reduced by 4. The waveform will therefore be of equal amplitude, but the time scale will be multiplied by 4. If the beam current is increased by a factor of 2 with constant spot size, the dimensions of the well will remain unchanged but the rate of change of potential will be increased by a factor of 2. This will yield a waveform having twice the amplitude, but with the time scale halved. From these considerations it follows that the area contained under the positive and negative halves of the waveform (which are equal and opposite) will be proportional to the area of the spot and independent of beam current, but the time scale with fixed spot size will be inversely proportional to beam current. These findings assume that the amplifier can respond infinitely rapidly; in fact it cannot, and since the waveform *e* is balanced, having equal positive and negative areas, if the time scale of the waveform is made short compared with the amplifier response time by sufficiently increasing the beam current, the waveform (*e*) will tend to vanish. This is not true of waveform *b* of Fig. 1, each pulse of which must always contain an area related to the magnitude of the negative cloud, no matter how big that cloud may be, or how rapidly it is instated. Hence, as the brilliance is increased, the waveform of Fig. 1(*b*) will increase indefinitely in amplitude, but that of Fig. 4(*e*) will only increase until it becomes too rapid relative to the response time of the amplifier, after which it will decrease.

Figure 2:
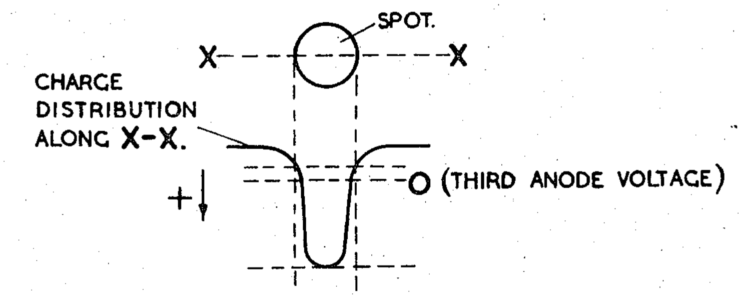

The net waveform seen at the output of the amplifier in the experiment illustrated in Figs. 3 and 4 is the sum of Fig. 1(*b*) and Fig. 4(*e*), and is typically as shown in Fig. 4(*f*), though many variations are possible by adjusting of brilliance and focus; the net pulse at the instant of bright-up can, in fact, be made negative if the brilliance is sufficiently increased, since the electron-cloud effect (producing a negative pulse) may be made to predominate.

So far, it has been assumed that the two bombarded spots were at a distance apart of some 1.25 spot diameters. A further experiment remains to be described, in which the separation of the spots was increased from zero, the beam current and focus being held at suitable constant values.

When the separation is zero, the conditions are, of course, the same as existed when bombardment of a single spot was discussed above, so that the signal pulse at beam turn-on is negative, due to the electron cloud effect above referred to, as in Fig. 1(*b*). As the separation was increased this negative pulse diminished and became zero with a separation of about 0.69*d* between the spot centres, *d* being the diameter of the spot. It appeared again sharply at a spacing of about 1.33*d* when the separation was still further increased. Meantime, the effect of secondary emission on beam turn on began to grow as the separation was increased from zero, since the well excavated at the first spot began to be partially filled in when the second spot was bombarded and "re-excavation" took place when the first spot was again bombarded. This effect, which gave rise to a positive pulse in the amplifier, increased steadily as the separation was increased, reaching the flat maximum at a separation of about *d* between the spot centres. Thereafter, it fell off rapidly, and became zero at about 1.33*d*. These two effects are shown as two separate curves in Fig. 5, which takes account only of the conditions at beam turn on, and shows in the lower curve the amplitude of the negative pulse and in the upper curve the amplitude of the positive pulse plotted against the separation of the spot centres as abscissa. The overall result as a signal pulse in the amplifier, therefore, becomes a negative pulse at zero separation, substantially zero signal at about 0.35*d*, a maximum positive pulse at about *d* and a negative pulse at about 1.33*d*.

The timing and the shape of the pulses shown in Fig. 1(*b*) and Fig. 4(*e*) are, however, not quite identical, the negative pulse being the sharper and earlier of the two. Hence, when they are of equal amplitude and are added, the result is not zero but a small negative pulse followed by a small positive pulse. It is for this reason that the amplitudes of the positive and negative pulses, due to the two effects, are considered separately and are plotted separately in Fig. 5. The negative pulse only becomes zero when the positive pulse is quite appreciable in magnitude.

It will be clear from the experimental results detailed above that if in a reading operation the beam is turned on to irradiate a certain discrete area or spot S on the screen of a cathode-ray tube, a positive or negative pulse may appear in the output of the pick-up plate amplifier, at the instant of turn on, the sign of the pulse depending on whether another spot within a critical distance of S (1.33*d* in the experiments) has or has not been bombarded since the spot S was last bombarded. This of course assumes that the reading operation takes place before there has been time for excessive loss of charge. Further, it will be clear that information derived from spot S can be used regeneratively as follows:

If a positive pulse is obtained, it can be used to actuate a circuit which shifts the beam through a distance, say *d*, from the spot, allows it to rest there and then extinguishes the beam. Then the next time spot S is tested, it will again give a positive indication. If S gave a negative signal, the circuit would be arranged not to introduce a shift, but to extinguish the beam whilst still at S: returning to the spot S would then give a negative indication provided no other bombardment within the critical distance of S had taken place in the meantime. Provided arrangements are made to return to S and regenerate the information there so frequently that significant leakage does not occur, the spot S will retain either its positive or its negative indication.

The surface of the cathode-ray tube screen can contain many such spots as S, and provided they are arranged to be at least the critical distance away from each other, there will be no mutual interference. Each spot can yield either a positive or a negative signal, and may be caused to do either by overriding the regeneration circuit described above by means of an input pulse which is timed to coincide with the instant of turn on of the beam, and is either positive or negative as desired.

Since the permissible separation between spots is a function of spot diameter, the number of digits that can be stored in a computor on a surface of given size will depend on the accuracy of focus. With ordinary commercial cathode-ray tubes, it is found possible to store a thousand digits in the 10 cm. square screen area available with 6″ tubes, using optimum focus. If the focus could be more perfect, more information could be stored, but the process cannot be continued without limit since the magnitude of the signal is proportional to spot area and will ultimately become less than noise. With the conditions stated above, the signal is much greater than noise. It is found, however, that there are some imperfect spots on the screen surface of commercial tubes which give consistently wrong indications. The incidence of these is about four per thousand spots using VCR97 tubes. The cause of these imperfections is not yet known, but their effect can be minimised by using less than optimum focus, so that the stored signal is increased and the small imperfection is used in conjunction with a considerable area of sound screen. The imperfections cease to be troublesome with de-focusing such that 1,000 digits are stored on the screen of a 12″ tube, but if the source of the imperfections is discovered and eliminated, as many as 10,000 digits might be stored on the screen of a 12″ tube.

The experimental basis of the invention having now been described, those versed in the art will readily be able to appreciate the nature of the invention, and many storage systems operating in accordance with the invention will suggest themselves. Certain specific storage systems, designed for digital computers, will however be described by way of example.

In what follows, it will be assumed throughout that the storage surface is the screen face of a cathode-ray tube; evidently, one advantage of such an arrangement is that operations can be visually monitored; but it must be borne in mind that storage may if desired be effected on any other suitable surface, such, for example, as the surface of a mica sheet arranged to be scanned by the beam.

In one system according to the invention, a television-type raster having 32 lines is repetitively drawn out on the tube face, each line occupying 320 microsecs. If the beam is turned on for 1 microsec. every 10 microsecs, synchronously with the sweep, each line appears as 32 dots, since the spot only traverses a fraction of its diameter during the period of bright-up. Whilst these conditions exist, the bombardment of each spot in turn will give rise in the pick-up plate amplifier to a negative initial signal, since for each spot no adjacent area has been bombarded, and the conditions are as first described with reference to Fig. 1(*b*). If, however, the initial one microsecond of bright-up is extended by a further period of 4 microseconds, the dots are replaced by short lines; now a positive pulse is obtained at the instant of each subsequent bright-up upon the original spot, since this spot has had bombardment in its vicinity since it was itself last bombarded, the bombardment of adjacent spots having occurred during the additional four microseconds of bright-up during the previous scan. Such a system can be arranged to "remember" "dots" and "dashes" indefinitely provided it is arranged that the additional four microseconds of bright-up is suppressed when a negative pulse is obtained from the amplifier, but is allowed to occur when the amplifier output is zero or positive. In a simple alternative arrangement, the occurrence of positive pulses may be caused to introduce the additional 4 microsecs. of bright-up which is absent with zero or negative pulses. In either event, one line of the raster may appear as in the upper part of Fig. 6: the binary principle it represents is written below (the convention that dot and dash represent 0 and 1 can, of course, be reversed if desired).

An important feature of this embodiment of the invention is that the amplifier output voltage is gated by a pulse of not more than one microsecond duration, which is synchronous with the time base and with the instant of bright-up and permits only the pulse generated at the instant of bright-up to influence the question of bright-up or blackout during the ensuing 4 microsecs. If in such a system scanning takes place at the rate of one complete raster every 50th of a second, so that all the stored information is regenerated fifty times a second, no spreading of charge due to leakage has been observed. The synchronous gating of the amplifier at the instant of bright-up ensures that spread cannot be cumulative from scan to scan.

Such an arrangement is illustrated in block schematic form in Fig. 7. The arrangement shown in this figure comprises a cathode-ray tube 1, on the screen of which the charge pattern constituting a store of information on binary principle is built up. The tube comprises a cathode, 2, a control grid 3, first and second anodes 4 and 5, a third anode 6 constituted by a conducting coating on the inside surface of the tube, and a signal pick-up plate 7 on the outside surface of the tube adjacent the screen. Two pairs of deflecting plates 8, 9 are provided to deflect the beam in two co-ordinate directions. The second and third anodes are held at earth potential, the remaining electrodes having suitable negative potentials to cause the tube to operate at a beam velocity such that the ratio of secondary electrons struck out from the screen to primary electrons arriving is greater than unity.

A generator 10 of rectangular pulses produces regularly recurring pulses which are to be used to synchronise the operation of all the correlated parts of the apparatus. These pulses are fed to a divider circuit 11 which counts down by a suitable factor to provide synchronising pulses for the two time base circuits 12, 13 which feed deflection voltages to the pairs of plates 8 and 9 respectively to set up a raster of 32 horizontal lines. Black-out between lines is provided by means omitted from the drawing for the sake of clarity. Each line is divided into 32 elements by a black-out waveform applied to the control grid 3, the elements being illuminated dots or dashes according to the information to be stored. This latter black-out waveform is derived from a switch circuit 14 in the following way. Pulses at the appropriate recurrence times for each element and of short and long duration corresponding to dots and dashes are generated in circuits 15 and 16 respectively, both of which are controlled by pulses from the pulse generator 10. The switch circuit 14 is controlled in turn by signals selected from the output from the amplifier 17, connected to the signal pick-up plate 7 on the tube 1, by a gate circuit 18. The switch circuit 14 is arranged normally to pass the short pulses or dot waveform from circuit 15 to the control grid 3 but is switched to pass the dash waveform from circuit 16 when a positive pulse appears at the pickup plate 7. The gate circuit 18 is controlled by a strobe circuit 19, which is fed with the short pulses derived from circuit 15 ensure that the gate 18 passes a signal from the amplifier to switch circuit 14 only at the moment of bright-up of the cathode-ray tube beam.

It will now be seen that as the screen of the cathode-ray tube 1 is illuminated at each bright-up, a signal will be generated in the amplifier 17 of a sign dependent on whether a dot or a dash was previously recorded on the tube screen at that point. If it was a dot the switch circuit 14 will be unaffected by signals from the gate 18 and will pass the dot waveform from circuit 15, and terminate the bright-up at the end of the dot period, but if it was a dash the switch 14 will be actuated to select the dash waveform from circuit 16, and maintain the cathode-ray tube beam switched on for a longer time, so that a dash is again recorded on the cathode-ray tube screen at the point in question.

If new information is to be written into the information storage device, this is effected by applying a suitable signal to an input terminal 20 connected to the switch circuit 14 and arranged to override the signal from the gate 18. Furthermore, it will be appreciated that the signals applied from the switch 14 to the control gid 3 of the cathode-ray tube represent the information read out of the store, and may therefore be used as output signals for application to a further part of the equipment in which the information is to be employed. The switch circuit 14 is therefore shown connected also to an output terminal 21.

Some details arise to be considered in connection with the scanning system to be employed. For example, the X-scan may comprise a uniform sweep for each line with rapid fly-back, but it may be preferable in some cases to employ for the X-scan a stepped waveform which provides for a short waiting period at each element position in order that a dot representation shall not be drawn out into a short line; economy of space may then be achieved. The X-scan should also be designed to provide a writing speed such that, on the one hand, a dash is of sufficient length to provide the positive signal output which distinguishes it from a dot, and on the other hand, so that the spacing between the elements will accommodate dashes while still leaving a spacing between the elements greater than the critical distance above referred to (which in the experiments described was 1.33 spot diameters), so that adjacent elements will not interfere with one another.

The system may be modified in many ways. For example, time may be saved by scanning rapidly between the end of a dash and the position of the next dot or dash. Again, the dot and dash arrangement may be replaced by a single dot or double dot by using an appropriate time base waveform.

Arrangements can readily be made to interrupt the regular scan at any time, and to direct the cathode ray beam in such a manner as to read off the information on any line, or write information into it.

In a further system according to the invention, using a similar raster scan, three states of each digit mark are catered for:

(*a*) A dot yielding and corresponding with a negative pulse.

(*b*) A short line yielding and corresponding with a zero pulse.

(*c*) A dash yielding and corresponding with a positive pulse.

In this case, the normal state of the system is that in which successive bright-ups cause the generation of "short lines," but the receipt of a negative pulse from the amplifier is arranged to curtail the short line into a dot, and the receipt of positive pulses is arranged to extend the short line into a dash. The three states could for example be used to represent 0, 1 and 2, on a ternary system of counting or −1, 0, and +1 on a binary system, the −1 and +1 constituting one digit and 0 the other digit.

The last-described system is based on the fact that when two adjacent areas are bombarded which are spaced by a short distance only (in the experiments, 0.35*d*, see Fig. 5) the amplifier output during each subsequent bright-up contains a portion in which a small negative pulse is followed by a small positive pulse; effectively, by comparison with the pulses due to dots and dashes, this is an approximately zero output, and can be gated out. In such an arrangement, dots give a negative output and dashes (representing the bombardment of more widely spaced areas) give a positive output. Clearly, should the short line corresponding to zero output tend to shorten or lengthen, the output will become negative or positive respectively; accordingly, it is proposed to devote a part of the raster to the recording of a series of short lines which, when subsequently re-explored, will yield a signal which can be employed to control automatically the length of the short lines so that they always give rise to a zero output.

The scanning systems so far described are most suitable for computers in which the digits of a given number are arranged sequentially in time, one complete number being stored on each line. Those are called series or sequential systems. Some computor designs are based on a parallel mode of operation in which all the digits of a given number are to be simultaneously available on different wires. Working on a basis of 32 digits per number, 32 tubes of the type described above might be used, one digit of each number occupying one space on each tube. With this arrangement, the digit occupying the 32nd space in any line only becomes available once every 320 miscrosecs. when the scan is of the raster type. This time can be reduced by splitting the scan into say 8 columns of short lines each containing 4 digits, and with arrangements made to read any one of the short lives at any time. This would reduce the maximum time required to obtain any digit to 40 microsecs.

Alternatively, the time sweep may be done away with altogether and replaced by a deflection signal generator which is arranged to sweep a spot discontinuously from space to sapce on the tube face by means of appropriate X and Y voltages, a choice of 32 voltages being available in the example considered for each coordinate. A further arrangement is then necessary to draw the spot out into a short line if positive pulses are obtained at the instant of turn on. Provided the deflection generator could be switched to any desired spot rapidly, any digit could be recovered at any time; the appropriate shift voltage could probably be generated with the required accuracy in some 20 microsecs.

In a further system according to the invention, which is particularly suitable to the step by step arrangement last described, in order to produce one state of charge, the beam is turned on at a given spot in a de-focussed state; and is then turned off. In order to produce the second state of charge the beam is turned on as before and then sharply focused before being turned off. When a defocused beam is turned on again upon a spot in the first state of charge (the beam having been turned off before sharp focusing during the previous engagement of the beam with the spot) a negative pulse results, but when a defocused beam is turned on upon a spot in the second state of charge a positive pulse will result. Accordingly, in regeneration, if a negative initial pulse is obtained when the defocused beam is switched on when directed upon a spot, the beam is arranged to be switched off without being sharply focused. On the other hand if a positive pulse is obtained, the beam is arranged to be sharply focused before being switched off. It may be arranged either that voltages applied to the tube normally focus the beam sharply before switching it off and that when a negative initial pulse occurs this pulse is applied to prevent sharp focusing. Alternatively the beam may be arranged normally to be switched off without sharp focusing and when a positive initial pulse occurs this may be applied to cause sharp focusing to take place before switching off. Ways in which these effects can be produced will be well understood by skilled persons. It will be seen that in this last system, as well as in those previously described, a first state of charge is assumed by an area through liberation of secondary electrons from the area and that a second state of charge is assumed, when required, by a further, and later, liberation of secondary electrons to the area, thus reducing the positive charge on the area. In the case of the last system described the area referred to is the outer annulus of the spot which during the assumption of the first state of charge loses secondary electrons and during the assumption of the second state of charge receives secondary electrons from the central part of the spot which is bombarded by the focused beam. The sharp focusing has the result of "filling in" the peripheral parts of the big well formed by the de-focused beam and leaves only the central part under the sharply-focused beam of full depth. When a de-focused spot is turned on again at this point, a positive pulse will result, since the well must be re-emptied again to full diameter.

It is emphasized that the storage arrangements specifically discussed above are given by way of example only, and the invention is not limited in its scope to these storage arrangements only. It will be apparent that the way in which the invention will be applied in a particular case will depend on the nature of the information to be stored, the desired order of reading, the required reading speed, and other considerations. Furthermore, it must be understood that the invention is not limited to the storage of signals in digital computers and like machines.

We claim:

1. In a device for storing digital information comprising, a surface of insulating material for storing digital information and having certain of its surface electrons removed from parts of said surface and concentrated on other parts of said surface in a physical arrangement constituting a large number of charge patterns thereon, said charge patterns being located in spaced lines and each pattern being sufficiently spaced from adjacent patterns that no pattern affects the charge of any other pattern, certain of said charge patterns being a single discrete charged spot, and other of said charge patterns each including two contiguous charged areas of different electron densities respectively resulting from the physical displacement of electrons from one contiguous charged area to the other contiguous charge area and potential producing means so positioned with respect to said surface and constructed and arranged to produce and to maintain said physical arrangement of electrons on said surface for any desired duration of time.

2. In a device for producing charge groups having patterns of either of two different types, one of which types is a spot of charge and the other of which types includes two proximate areas having different densities of charge respectively; a large insulating surface for recording said charges; an electron gun for directing a confined beam of electrons at said surface; beam deflecting means for moving said beam so it will strike the surface in different places; beam interrupting means for interrupting the beam; input means operable to either of first or second conditions respectively; and control means controlled by said input means for controlling the beam deflecting means and the beam interrupting means; said control means including means which when the input means is in its first condition causes the electron gun to emit a confined beam at one spot on said surface, which when the input means is in its second condition causes the electron gun to emit a beam that initially strikes at least a part of the second-named pattern and during a later period strikes a limited part of said second-named pattern which is not co-extensive with the first-named part, and which during a shift from the first to the second of said conditions interrupts said beam, said control means including means for operating the beam deflecting means to effect different beam positions sequentially whereby either of said two types of patterns can be produced at any of said positions by operation of the input means at the proper time.

3. In a system of recording having a charge retaining surface with different charge groups thereon, the method of regenerating predetermined charge groups that define a pattern having proximate areas respectively of different densities of charge, comprising, the step of first determining the charge existing on at least a part of said predetermined charge groups to thereby distinguish said predetermined charge groups from existing dissimilar charge groups on the surface, in event the foregoing step shows the charge detected to be within predetermined limits then to first bombard at least a portion of said pattern with electrons and later to bombard a limited portion of the pattern with electrons, the velocity of said bombardments being so high that more secondary electrons are liberated at said surface than there are primary electrons arriving.

4. The method of recording digital information as a charge pattern on an insulating surface by representing different digit values by different states of electrostatic charge respectively, which comprises recording each digit on a corresponding discrete area on said surface by first causing said area to assume one of said states of charge by the liberation of secondary electrons therefrom so that said area is left with a positive charge, and achieving where appropriate another of said states of charge by a further and essentially immediate liberation of secondary electrons from said surface so as to modify said positive charge.

5. The method of recording digital information as a charge pattern on an insulating surface by representing different digit values by different states of electrostatic charge respectively which comprises recording each digit on a corresponding discrete area on said surface by first causing said area to assume one of said states of charge by the liberation of secondary electrons therefrom so that said area is left with a positive charge, and achieving where appropriate another of said states of charge by a further and essentially immediate liberation of secondary electrons from said surface so as to render the charge on said area less positive.

6. The method of recording digital information as a charge pattern on an insulating surface by representing different digit values by different states of positive electrostatic charge respectively which comprises recording each digit on a corresponding discrete area on said surface by first bombarding said area with a cathode ray beam of such velocity that the number of secondary electrons liberated from said area is greater than the number of primary electrons arriving whereby said area assumes one of said states of positive charge, and achieving where appropriate another of said states of charge by a further bombardment to effect a further and essentially immediate liberation of secondary electrons from said surface so as to modify said positive charge.

7. The method of recording digital information as a charge pattern on an insulating surface by representing different digit values by different states of positive electrostatic charge respectively which comprises recording each digit on a corresponding discrete area on said surface by first bombarding said area with a cathode ray beam of such velocity that the number of secondary electrons liberated from said area is greater than the number of primary electrons arriving whereby said area assumes one of said states of positive charge, and achieving where appropriate another of said states of charge by a further bombardment to effect a further and essentially immediate liberation of secondary electrons from said surface so as to render the charge on said area less positive.

8. The method of recording binary digital information as a charge pattern on an insulating surface by representing the different digit values by one or the other of two different states of electrostatic charge which comprises effecting a scan of at least a part of the surface with a cathode ray beam having an electron velocity of such value that the number of secondary electrons liberated from the surface is greater than the number of primary electrons arriving, repeatedly increasing for short time periods the beam intensity to such a value that discrete areas of the surface assume one state of positive charge, and achieving where appropriate the other state of charge on any area by extending the duration of the short time period by a fixed amount less than the interval between successive time periods.

9. The method of recording digital information as a charge pattern on an insulating surface and of subsequently regenerating the charge pattern which comprises producing an electron beam at a velocity such that, when the beam strikes the surface, the number of secondary electrons liberated is greater than the number of primary electrons arriving, directing the beam at recurring instants towards a discrete area of said surface, the beam being controllable between two conditions in one of which it bombards said discrete area only to produce a state of charge on said area which is significant of one element of information and in the other of which it bombards first said discrete area and subsequently such part of said surface that the charge upon the discrete area is modified to render it significant of a different element of information, applying an input signal to select the appropriate one of said conditions during one of said instants, detecting changes in charge on said surface due to the beam, and applying a regenerating signal arising from such detection during subsequent instants to select the same condition and thereby regenerate the charge upon said discrete area.

10. Electrical information-storing means comprising an insulating recording surface contained in an evacuated envelope, an electron gun within the envelope for producing an electron beam at a velocity such that when the beam strikes the surface, the number of secondary electrons liberated is greater than the number of primary electrons arriving, beam-deflecting means, a deflecting-voltage generator connected to said beam deflecting means for directing the beam at recurring instants towards a discrete area on said surface, a beam-controlling voltage generator adapted to produce control voltages having one or other of two states, said generator including means for selecting and utilizing the appropriate one of said states to control the beam between two conditions in one of which it bombards said discrete area only to produce a state of charge on this area which is significant of one digit of information to be stored and in another of which it bombards first said discrete area and subsequently such part of said surface that the charge on the discrete area is modified to render it significant of a different digit of said information, and an input signal circuit connected to apply an information signal to said beam-controlling generator during said instants to select the appropriate one of said states of control voltage.

11. Electrical information-storing means according to claim 10 wherein said beam-controlling voltage generator is arranged to produce control voltages consisting of recurrent pulses and said deflecting-voltage generator is arranged to produce periodically varying deflecting voltages locked to the repetition frequency of said pulses whereby said beam is directed sequentially and repetitively towards a plurality of discrete areas distributed over said surface, and the appropriate one of said control voltage states is selected in accordance with the instantaneous value of said signal at the times of engagement of the beam with the discrete areas.

12. Electrical information-storing means according to claim 10 wherein said deflection-voltage generator is arranged to produce sweep voltages whereby said beam is caused to scan a raster on said surface, wherein said beam-controlling generator is arranged to produce control voltages consisting of recurrent pulses which in one state have a greater duration than in the other and wherein there is provided a connection for applying said pulses to momentarily and repeatedly increase the intensity of said beam to a value sufficient to charge discrete areas of said surface.

13. Electrical-information storing means comprising an insulating recording surface contained in an evacuated envelope, an electron gun within the envelope for producing an electron beam at a velocity such that when the beam strikes the surface the number of secondary electrons liberated is greater than the number of primary electrons arriving, beam-deflecting means adjacent said gun, a deflecting voltage generator connected to said beam-deflecting means for directing the beam at recurring instants towards a discrete area on said surface, a beam-controlling voltage generator adapted to produce control voltages having one or other of two states, said generator including means for selecting and utilizing the appropriate one of said states to control the beam between two conditions in one of which it bombards said discrete area only to produce a state of charge on this area which is significant of one digit of information to be recorded, and in another of which it bombards first said discrete area and subsequently such part of said surface that the charge on the discrete area is modified to render it significant of a different digit of said information, an input signal circuit connected to apply an information signal to said beam-controlling generator during one of said instants to select the appropriate one of said states of control voltage, pick-up means associated with said circuit and connected to apply regeneration signals to said beam-controlling generator during subsequent instants and thereby repeatedly select the same one of said states to cause regeneration of the charge upon said discrete area.

14. Electrical information-storing means according to claim 13 wherein said beam-controlling voltage generator is arranged to produce control voltages consisting of recurrent pulses and said deflecting voltage generator is arranged to produce periodically varying deflecting voltages locked to the repetition frequency of said pulses whereby said beam is directed sequentially and repetitively towards a plurality of discrete areas distributed over said surface and the appropriate one of said control voltage states is selected in accordance with the instantaneous value of the signal applied to said control-voltage generator at the times of engagement of the beam with the discrete areas.

15. Electrical information-storing means according to claim 13 wherein said deflection-voltage generator is arranged to produce sweep voltages whereby said beam is caused to scan wherein said raster on said surface, a beam-controlling generator is arranged to produce control voltages consisting of recurrent pulses which in one state have a greater duration than in the other, and a connection for applying said pulses to momentarily and repeatedly increase the intensity of said beam to a value sufficient to charge discrete areas of said surface.

16. Electrical information-storing means according to claim 13 wherein said pick-up means are connected to said beam-controlling generator through a gate circuit fed with selecting pulses timed to select from the signals arising in said pick-up means only the initial transient signal obtained when a discrete area is bombarded.

17. Electrical information-storing means comprising an insulating recording surface contained in an evacuated envelope, an electron gun within the envelope for producing an electron beam, beam deflector means to direct said beam at recurrent instants towards a discrete area on said surface, beam affecting means to control said beam between two conditions in one of which it bombards said discrete area at each said instant physically to arrange the surface electrons of said discrete area to produce on such area a physical arrangement of electrons producing a charge significant of one item of information and in the other of which it bombards first said discrete area and subsequently such part of said surface that certain of its surface electrons are removed from parts of said surface and concentrated on other parts of said surface in a physical arrangement such that the charge on the discrete area is modified to signify another item of information, and signal input means connected to apply an information signal to said control means during said instants to select the appropriate one of said conditions, said surface, said gun and said beam affecting means being so constructed and arranged that said physical arrangements of electrons on discrete areas signifying items of information are maintained as long as desired until changed by a signal from said signal input means.

18. Electrical information-storing means comprising an insulating recording surface contained in an evacuated envelope, an electron gun within the envelope for producing an electron beam, beam deflector means to direct said beam at recurrent instants towards a discrete area on said surface, beam affecting means to control said beam between two conditions in one of which it bombards said discrete area at each said instant physically to arrange the surface electrons of said discrete areas to produce on such area a physical arrangement of electrons producing a charge significant of one item of information and in the other of which it bombards first said discrete area and subsequently such part of said surface that certain of its surface electrons are removed from parts of said surface and electrons are concentrated on other parts of said surface in a physical arrangement such that the charge on the discrete area is modified to signify another item of information, a signal pick-up plate capacitively coupled to said recording surface, and signal selector means connected to said signal pick-up plate and to said beam affecting control means to apply signals from said signal plate to said control means during said instants to select the one of said conditions appropriate to regenerate the charge upon said discrete area and so to maintain the selected individual physical arrangements of electrons for any desired period of time.

19. Electrical information-storing means according to claim 17, wherein said beam affecting means is so constructed that in said one condition the beam generates a positive charge on said discrete area and in said other condition the beam first generates a positive charge on the area and subsequently reduces the positive charge on the area.

20. Electrical information-storing means according to claim 17, wherein said control means comprise means to generate recurrent pulses of short and long duration and means to apply said pulses to increase the intensity of said beam.

21. Electrical information-storing means according to claim 20 comprising means connected to deflect said beam a short distance over said surface during certain of said instants whereby to produce said modified charge.

22. Electrical information-storing means according to claim 17, wherein said control means comprise means for controlling the focus of said beam to render said beam poorly focused during the bombardment in said other condition and sharply focused during said subsequent bombardment in said other condition, whereby said part of said surface lies within the outer boundaries of said discrete area.

23. Electrical information-storing means according to claim 18, wherein said beam affecting means is so constructed and arranged that in said one condition the beam generates a positive charge on said discrete area and in said other condition the beam first generates a positive charge on the area and subsequently rearranges the physical distribution of electrons on said area which reduces the positive charge on the area.

24. Electrical information-storing means according to claim 18, wherein said control means comprise means to generate recurrent pulses of short and long duration and means to apply said pulses to increase the intensity of said beam.

25. Electrical information-storing means according to claim 24 comprising means connected to deflect said beam a short distance over said surface during certain of said instants whereby to produce said modified charge.

26. Electrical information-storing means according to claim 18, wherein said control means comprise means for controlling the focus of said beam to render said beam poorly focused during the bombardment in said other condition and sharply focused during said subsequent bombardment in said other condition, whereby said part of said surface lies within the outer boundaries of said discrete area.

27. In a device for producing charge groups having patterns of different types, one of which types is a spot of charge and another of which types includes two proximate areas having different densities of charge respectively; an insulating surface for recording said charges; an electron gun for directing a confined beam of electrons at said surface; beam deflecting means for moving said beam so it will strike the surface in different places; signal input means operable to affect said beam to produce either of said first or said second conditions respectively; and control means connected to and controlled by said input means, said control means being constructed and arranged to cause the electron gun to emit a confined beam at one spot on said surface when the input means is in said first condition to produce a first physical arrangement of electrons at said spot on said surface, and to cause the electron gun to emit a beam that initially strikes at least a part of the second-named pattern and during a later period strikes a limited part of said second-named pattern which is not coextentive with the first-named part when the input means is in said second condition to produce a modified physical arrangement of electrons on said surface, said beam deflecting means being connected to effect different beam positions sequentially whereby either of said two types of patterns can be produced at any of said positions by operation of the input means at the proper time.

28. The method of recording digital information as a charge pattern on an insulating surface by representing different digits by different states of electrostatic charge respectively which comprises recording the digits on discrete areas respectively of said surface by bombarding said areas with charged particles for a first period of time to record a first digit value, and subjecting selected areas to further bombardment by charged particles for an additional period of time starting essentially immediately after said first bombardment, to modify the charge on said selected areas to record a second digit value.

29. An electrical device for storing digital information comprising an electric charge-retaining surface, means positioned and arranged to charge, in succession, spaced discrete areas on said surface to a first value significant of one digit by arranging the physical position of electrons on said surface, charge-modifying means cooperating with said first mentioned means for modifying the said arrangement of electrons on each discrete area before the charging of a next discrete area, to a value significant of a second digit, and regulating means connected to said charge modifying means and constructed to regulate the operation of said charge-modifying means according to the digit to be stored.

30. The combination set forth in claim 29, said charge-modifying means having a portion positioned between said charging means and said surface, said portion being constructed and arranged to control the size of said spaced discrete areas on which electrons are physically arranged.

31. The combination set forth in claim 29, said charge-modifying means having a portion positioned between said charging means and said surface, said portion being constructed and arranged to control the shape of the physical arrangement of electrons on said spaced discrete areas.

32. The combination set forth in claim 29, said first named means comprising an electron gun for directing an electron beam at said surface, a focusing electrode for said beam, said charge-modifying means being connected to said electrode whereby the desired physical arrangements of electrons on said discrete areas is obtained by controlling the focus of said beam.

33. The combination set forth in claim 29, said first named means comprising an electron gun for directing an electron beam at said surface and a displacement electrode for said beam, said charge-modifying means being connected to said electrode whereby the desired physical arrangements of electrons on said discrete areas is obtained by a short displacement of the beam of the order of a spot diameter.

34. Apparatus for creating a charge pattern indicative of at least two kinds of information on a beam target associated with an electron storage apparatus that comprises means to produce a beam of charged particles while controlling a characteristic thereof such that upon striking said target the number of secondary electrons liberated is greater than the number of primary electrons arriving in said beam, means to bombard selected discrete areas of said target with said beam to produce one kind of information and to bombard other selected discrete areas of said target and areas contiguous with said other selected discrete areas with said beam to produce the other kind of information.

35. Apparatus as claimed in claim 34 wherein said characteristic controlling means is a beam velocity controlling means.

36. Apparatus as claimed in claim 34 wherein said bombarding means includes a means to control the focus of said beam.

37. Apparatus for creating a charge pattern indicative of at least two kinds of information on a beam target associated with an electron storage apparatus that comprises means to produce a beam of charged particles while controlling a characteristic thereof such that upon striking said target the number of secondary electrons liberated is greater than the number of primary electrons arriving in said beam, means to bombard selected discrete areas of said target with said beam to produce one kind of information and to bombard other selected discrete areas of said target and areas adjacent to said other selected discrete areas with said beam to produce the other kind of information.

38. Apparatus for creating a charge pattern indicative of at least two kinds of information on a beam target associated with an electron storage apparatus that comprises means to produce a beam of charged particles while controlling a characteristic thereof such that upon striking said target the number of secondary electrons liberated is greater than the number of primary electrons arriving in said beam, means to bombard selected discrete areas of said target with said beam to produce one kind of information and to bombard other selected discrete areas of said target and areas within said other selected discrete areas with said beam to produce the other kind of information.

(References on following page)

References Cited in the file of this patent

UNITED STATES PATENTS

| | | |
|---|---|---|
| 2,034,704 | Nakashima et al. | Mar. 24, 1936 |
| 2,219,021 | Riesz | Oct. 22, 1940 |
| 2,241,809 | De Forest | May 13, 1941 |
| 2,407,000 | Evans | Sept. 3, 1946 |
| 2,432,173 | Rhea | Dec. 9, 1947 |
| 2,436,677 | Snyder | Feb. 24, 1948 |
| 2,451,005 | Weimer et al. | Oct. 12, 1948 |
| 2,458,291 | Munster et al. | Jan. 4, 1949 |
| 2,473,691 | Meacham | June 21, 1949 |
| 2,498,081 | Joel | Feb. 21, 1950 |
| 2,508,408 | Liebson | May 23, 1950 |
| 2,524,837 | Russell | Oct. 10, 1950 |
| 2,560,585 | McMillin | July 17, 1951 |
| 2,639,425 | Russell | May 19, 1953 |